(12) United States Patent
Hu et al.

(10) Patent No.: US 11,991,186 B2
(45) Date of Patent: May 21, 2024

(54) ATTACK SOURCE TRACING IN SFC OVERLAY NETWORK

(71) Applicant: Nokia Technologies Oy, Espoo (FI)

(72) Inventors: Zhiyuan Hu, Shanghai (CN); Jing Ping, Chengdu (CN); Stephane Mahieu, Munich (DE); Yueming Yin, Shanghai (CN); Zhigang Luo, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 818 days.

(21) Appl. No.: 17/057,571

(22) PCT Filed: May 22, 2018

(86) PCT No.: PCT/CN2018/087917
§ 371 (c)(1),
(2) Date: Nov. 20, 2020

(87) PCT Pub. No.: WO2019/222927
PCT Pub. Date: Nov. 28, 2019

(65) Prior Publication Data
US 2021/0211439 A1 Jul. 8, 2021

(51) Int. Cl.
*G06F 21/00* (2013.01)
*H04L 9/40* (2022.01)
*H04L 45/302* (2022.01)

(52) U.S. Cl.
CPC ........ *H04L 63/1416* (2013.01); *H04L 45/306* (2013.01); *H04L 63/1425* (2013.01); *H04L 63/1441* (2013.01); *H04L 2463/146* (2013.01)

(58) Field of Classification Search
CPC ............... H04L 63/1416; H04L 45/306; H04L 63/1425; H04L 63/1441; H04L 2463/146;
(Continued)

(56) References Cited

U.S. PATENT DOCUMENTS

| | | | |
|---|---|---|---|
| 7,814,546 B1 | 10/2010 | Strayer et al. | |
| 2014/0007236 A1* | 1/2014 | Krueger | G06F 21/566 726/23 |

(Continued)

FOREIGN PATENT DOCUMENTS

| | | |
|---|---|---|
| CN | 102497362 A | 6/2012 |
| CN | 104348794 A | 2/2015 |

(Continued)

OTHER PUBLICATIONS

Extended European Search Report received for corresponding European Patent Application No. 18919502.7, dated Nov. 10, 2021, 7 pages.

(Continued)

*Primary Examiner* — Ghazal B Shehni
(74) *Attorney, Agent, or Firm* — SQUIRE PATTON BOGGS (US) LLP

(57) ABSTRACT

Embodiments of the present disclosure relate to methods, devices and computer readable storage medium for tracing an attack source in a service function chain overlay network. In example embodiments, a request for tracing an attack source of an attacking data is sent at the attack tracer to a first service function chain domain of a plurality of service function chain domains through which the attacking data flow passes subsequently. The request includes flow characteristics of the attacking data flow. Then, the attack tracer receives a first set of results of flow matching based on the flow characteristics from the first service function chain domain. The attack tracer identifies the attack source in the plurality of service function chain domains at least in part based on the first set of results. In this way, the attack source may be traced efficiently in the service function chain overlay network.

17 Claims, 6 Drawing Sheets

(58) Field of Classification Search
CPC ............ H04L 63/1458; H04L 63/1466; H04L 63/1408; G06F 21/55
See application file for complete search history.

(56) References Cited

U.S. PATENT DOCUMENTS

| | | | |
|---|---|---|---|
| 2016/0373474 A1* | 12/2016 | Sood | G06F 21/53 |
| 2017/0048815 A1 | 2/2017 | Clarke et al. | |
| 2017/0134403 A1* | 5/2017 | Hearn | H04L 63/1425 |
| 2017/0180234 A1 | 6/2017 | Agrawal et al. | |
| 2017/0180237 A1 | 6/2017 | Mulka et al. | |
| 2017/0346752 A1 | 11/2017 | Krishnamurthy et al. | |
| 2018/0004781 A1* | 1/2018 | Mukherjee | G06F 16/22 |
| 2019/0116158 A1* | 4/2019 | Patil | H04L 63/123 |

FOREIGN PATENT DOCUMENTS

| | | |
|---|---|---|
| CN | 107819742 A | 3/2018 |
| KR | 20040042397 A | 5/2004 |
| WO | 2004/062232 A1 | 7/2004 |
| WO | 2017/069736 A1 | 4/2017 |
| WO | 2017/195184 A1 | 11/2017 |

OTHER PUBLICATIONS

"Wiserv", China Wiserv, Retrieved on Oct. 16, 2020, Webpage available at : http://www.chinawiserv.com/home/index/dashuju.html.

Halpern et al., "Service Function Chaining (SFC) Architecture", RFC 7665, Internet Engineering Task Force (IETF), Oct. 2015, pp. 1-32.

Quinn et al., "Network Service Header (NSH)", Network Service Header (NSH), RFC 8300, Internet Engineering Task Force (IETF), Jan. 2018, pp. 1-40.

Savage et al., "Network Support for IP Traceback", IEEE/ACM Transactions on Networking, vol. 9, No. 3, Jun. 2001, pp. 226-237.

Snoeren et al., "Single-Packet IP Traceback", IEEE/ACM Transactions on Networking, vol. 10., No. 6, Dec. 2002, pp. 721-734.

Lipson, "Tracking and Tracing Cyber-Attacks: Technical Challenges and Global Policy Issues", Special Report, CMU/SEI-2002-SR-009, Nov. 2002, 85 pages.

Stone, "CenterTrack: An IP Overlay Network for Tracking DoS Floods", Proceedings of 9th Usenix Security Symposium, 2000, 15 pages.

Hussein et al., "SDN VANETs in 5G: An Architecture for Resilient Security Services", Fourth International Conference on Software Defined Systems (SDS), 2017, pp. 67-74.

International Search Report and Written Opinion received for corresponding Patent Cooperation Treaty Application No. PCT/CN2018/087917, dated Feb. 20, 2019, 10 pages.

Office action received for corresponding Chinese Patent Application No. 201880093651.6, dated Oct. 25, 2022, 6 pages of office action and no page of translation available.

Office action received for corresponding Indian Patent Application No. 202047054156, dated Dec. 20, 2021, 5 pages.

* cited by examiner

ATTACK SOURCE TRACING IN SFC OVERLAY NETWORK

RELATED APPLICATION

This application claims priority to PCT Application No. PCT/CN2018/087917, filed on May 22, 2018, which is incorporated herein by reference in its entirety.

FIELD

Embodiments of the present disclosure generally relate to the field of attack source tracing, and in particular, to methods, devices and computer readable storage medium for tracing an attack source in a service function chain (SFC) overlay network.

BACKGROUND

Cloud based data services have been offered by a data service provider by collecting diversity data from various data resources. However, some Internet of Things (IoT) devices, such as traffic cameras, electricity meters and gas meters, have limited security capabilities, and therefore those IoT devices may be utilized easily by attackers to create intentional attacks, for example Denial of Service (DoS) attacks, to services, systems, and cloud-based data centers. In addition to the potential attacks through the IoT devices with the limited security capabilities, the attacks through other network equipment such as routers and service functions are also common.

Typically, in order to prevent or mitigate network attacks, especially the DoS attacks, the attacks are first detected by security appliances, and then attacks sources are traced and the attacks are blocked. Many security appliances have been proposed to prevent the network attacks. Some security appliances such as firewalls and Intrusion Prevention Systems (IPSs) cannot prevent some specific attacks, such as Transmission Control Protocol (TCP) synchronization (SYN) flooding and the DoS attacks. Intrusion Detection Systems (IDSs), which have been widely deployed to detect the network attacks, could not identify network attack sources.

However, it is a big concern to trace attack sources for the DoS attacks. In the DoS attacks, the attackers may not receive packets from an attacked target and thus remain hidden. For the DoS attacks, it is very important to identify the network attack sources so as to block the source and prevent or mitigate the attacks.

SUMMARY

In general, example embodiments of the present disclosure provide methods, devices and computer readable storage medium for tracing an attack source in a service function chain (SFC) overlay network.

In a first aspect, a method is provided at an attack tracer. A request for tracing an attack source of an attacking data is sent at the attack tracer to a first SFC domain of a plurality of SFC domains through which the attacking data flow passes subsequently. The request includes flow characteristics of the attacking data flow. Then, the attack tracer receives a first set of results of flow matching based on the flow characteristics from the first SFC domain. The attack tracer identifies the attack source in the plurality of SFC domains at least in part based on the first set of results.

In a second aspect, a method is provided at a SFC controller in a SFC domain. The classifier receives an instruction for flow matching based on flow characteristics of an attacking data flow that passes through the plurality of SFC domains subsequently. The classifier determines whether the flow characteristics of the attacking data flow matches with flow characteristics associated with the attacking data flow stored at the classifier. If the flow characteristics of the attacking data flow matches with the stored flow characteristics, the classifier sends an indication that the flow characteristics of the attacking data flow matches with the stored flow characteristics. The classifier also sends an indication of a second SFC domain of the plurality of SFC domains. The attacking data flow passes through the second and first SFC domains successively.

In a third aspect, a method is provided at a SFC controller in a SFC domain. The SFC controller receives, from an attack tracer, a request for tracing an attack source of an attacking data flow passing through the SFC domain. The request includes flow characteristics of the attacking data flow. Based on the flow characteristics, the SFC controller determines a service function path (SFP) of the attacking data flow in the SFC domain. The SFC controller sends an instruction for flow matching based on the flow characteristics to at least a classifier included in the SFP.

In a fourth aspect, there is provided a device comprising at least one processor and at least one memory including computer program code. The at least one memory and the computer program code are configured to, with the at least one processor, cause the device to perform the method according to the first, second or third aspect.

In a fifth aspect, there is provided a computer readable storage medium that stores a computer program thereon. The computer program, when executed by a processor, causes the processor to perform the method according to the first, second or third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
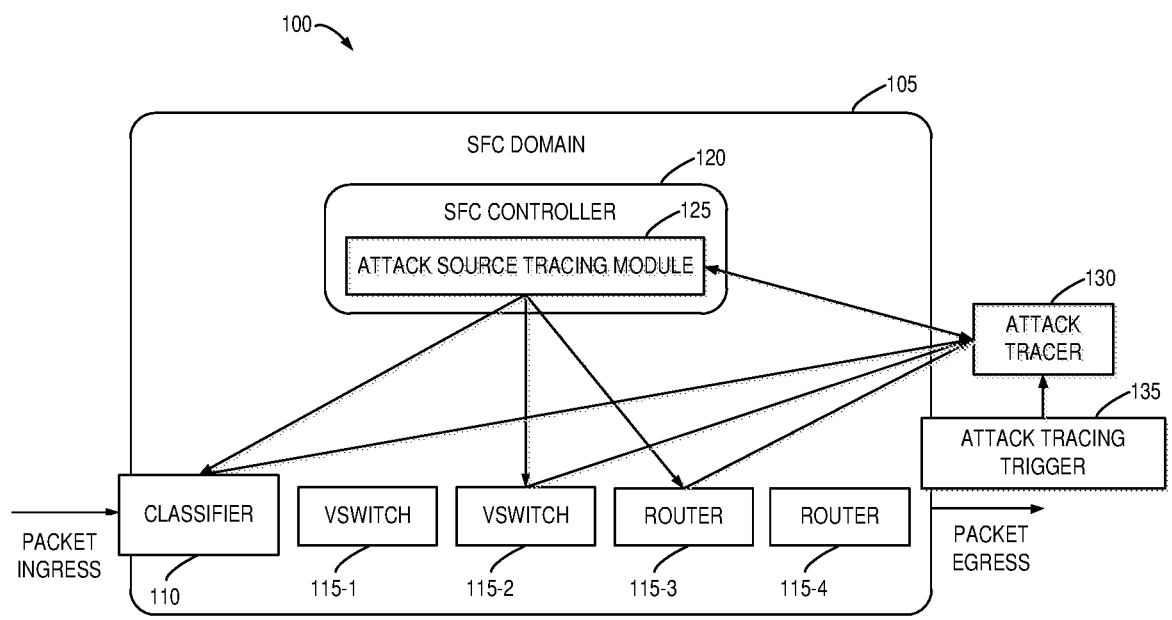
FIG. 1 illustrates an example SFC-enabled network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "SFC domain" refers to an area or a region of a network that implements SFC. An SFC domain may be limited to a single network administrative domain.

As used herein, the term "Service Function Path" or "SFP" refers to a path through which packets pass the SFC domain. A SFP is composed of entities in the SFC domain, including, for example, a classifier, a service function forwarder (SFF), a service function (SF) and other entities.

As used herein, the term "Service Function Chain" or "SFC" refers to an ordered set of SFs, SFFs and other entities in the SFC domain to be applied to packets, frames and/or flows selected as a result of classification.

As used herein, the term "classifier" refers to an entity for performing classification in the SFC domain. The classification may involve locally instantiated matching of traffic flows against policy for subsequent application of the required set of network service functions. The policy may be customer, network or service specific.

As used herein, the term "Service Function" or "SF" refers to a function or entity that is responsible for specific treatment of received packets. A SF can act at various layers of a protocol stack. As a logical component, a SF can be realized as a virtual element or be embedded in a physical network element. One or more SFs can be embedded in the same network element. Multiple occurrences of the service function can exist in the same administrative domain. One or more SFs can be involved in the delivery of services. A non-exhaustive list of SFs includes: firewalls, Wide area network (WAN) and application acceleration, Deep Packet Inspection (DPI), Lawful Intercept (LI), server load balancing, HOST_ID injection, Hyper Text Transfer Protocol (HTTP) Header Enrichment functions, and Transmission Control Protocol (TCP) optimizer.

As used herein, the term "Service Function Forwarder" or "SFF" refers to an entity responsible for forwarding traffic to one or more connected service functions according to information carried in the SFC encapsulation, as well as handling traffic coming back from the SF. Additionally, an SFF is responsible for delivering traffic to a classifier when needed and supported, transporting traffic to another SFF (in the same or different type of overlay), and terminating the SFP.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, in order to prevent or mitigate the network attacks especially the DoS attacks, it's very important to identify the attack source. Two categories of tracing systems have been used, including a proactive tracing system and a reactive tracing system.

In the proactive tracing system, information for tracing is prepared when packets are transmitted. Some schemes have been proposed for the proactive tracing system. One of the schemes is a packet marking scheme. With the packet marking scheme, packet information is recorded for use in tracing back to a packet source if suspicious activities occur in a network. For example, router information is stored in packets. By using this router information, the source of the packets may be traced back along the corresponding router path.

An Internet Control Message Protocol (ICMP) traceback scheme is another scheme for the proactive tracing system, which requires each router passed by suspicious packets to generate an ICMP trace back message. The trace back message typically includes hop information and a timestamp which can be used for a path recovery to identify the routing path back to an original source. A hash-based Internet Protocol (IP) traceback scheme for the proactive tracing system proposes a hash-based technique for IP traceback that generates audit trails for traffic within the network. This scheme may trace the origin of a single IP packet delivered through the network recently.

Different from the proactive tracing system, in the reactive tracing system, the tracing is started after the DoS attacks are detected. Hop-by-hop tracing is proposed for the reactive tracing system. For example, a tracing program may be installed into every router. The tracing program in the router located closest to the attacker may be first used for monitoring incoming packets. If the attackers use spoofed IP addresses to launch the attacks, the packets with these IP addresses can be stored into the routers for monitoring. This procedure of monitoring will be repeated in the adjacency routers hop by hop until the attacker's originated IP address is identified. For an overlay network, a technique is proposed to add traceability to a router in order to recover an attacking path back to the attackers. This technique can be accomplished by adding a device called a tracking router to monitor all traffic passing through this network.

The inventors find that according to the SFC architecture, a SFC control plane is aware of a service function path (SFP) of each flow or packet. When the network attacks are detected, the SFP may be used to trace the attack source. No conventional tracing technique is SFP-based.

Embodiments of the present disclosure provide a scheme of tracing network attacks to their sources in a SFC-enabled network. This scheme provides an attack tracer for tracing an attack source of an attacking data flow in a plurality of SFC domains. The attack tracer sends a request for tracing the attack source to one of the SFC domains. The request includes flow characteristics of the attacking data flow. The flow characteristics may include a service path identifier (SPI), a classifier identifier (ID), a SFF ID and the like. This request will trigger flow matching based on the flow characteristics in the SFC domain. Based on the result of the flow matching, the attack tracer can identify the attack source in the plurality of SFC domains.

FIG. 1 illustrates an example SFC-enabled network 100 in which embodiments of the present disclosure may be implemented. In the network 100, a SFC domain 105 is deployed as shown only for the purpose of illustration, without suggesting any limitations. A plurality of SFC domains can be deployed in the network 100.

The SFC domain 105 includes a classifier 110 acting as an entrance of the SFC domain 105. The SFC domain 105 also includes a plurality of SFFs 115-1, 115-2, 115-3 and 115-4, collectively referred to as a SFF 115. The SFF 115 may be implemented by any suitable physical or virtual machine such as a virtual switch and a router, as shown. The numbers of classifiers and SFFs are only illustrative but not limited. For example, in some embodiments, more classifier may be arranged in the SFC domain 105.

In this example, the SFC domain 105 may also include a SFC controller 120 which comprises an attack source tracing module 125. The attack source tracing module 125 can communicate with the classifier 110 and the SFFs 115 to initiate attack source tracing in the SFC domain 105.

In the network 100, an attack tracer 130 is arranged for attack source tracing within the SFC domain 105 or across a plurality of SFC domains (not shown). The attack tracer 130 may be triggered by an attack tracing trigger 135 to perform the attack tracing if an attack is detected. The attack tracer 130 may also communicate with the classifier 110 and the SFFs 115 in the SFC domain 105 for the attack source tracing.

The distributed arrangement of the attack source tracing module 125, the attack tracer 130 and attack tracing trigger 135 is shown only for the purpose of illustration, without suggesting any limitation. In some embodiments, the attack source tracing module 125, the attack tracer 130 and the attack tracing trigger 135 may be integrated in one or two entities. For example, the functions of the attack source tracing module 125, the attack tracer 130 and the attack tracing trigger 135 may be integrated in the SFC controller 120, or distributed in one or more entities outside of the SFC domain 105.

The communications in the network 100 may be implemented in wired or wireless way. Any suitable communication technologies may be used that exists or to will be developed in the future.

In various embodiments of the present disclosure, if an attacking data flow passing through the SFC domain 105 is detected in the network 100, the attack tracer 130 sends a request for tracing an attack source of the attacking data flow to the SFC domain 105. The request including flow characteristics of the attacking data flow, such as a SPI, a classifier ID, a SFF ID and the like. Then, the attack tracer 130 receives a set of results of flow matching that is performed by the classifier 110 and/or the SFF 115 based on the flow characteristics. Based on the results, the attack tracer 130 can identify the attack source in the SFC domain 105 or another SFC domain (not shown) through which the attacking data flow is passing through. Detailed operations and actions of the SFC-enabled entities will be described below with reference FIGS. 2, 3, 4(a) and 4(b).

Figure 2:
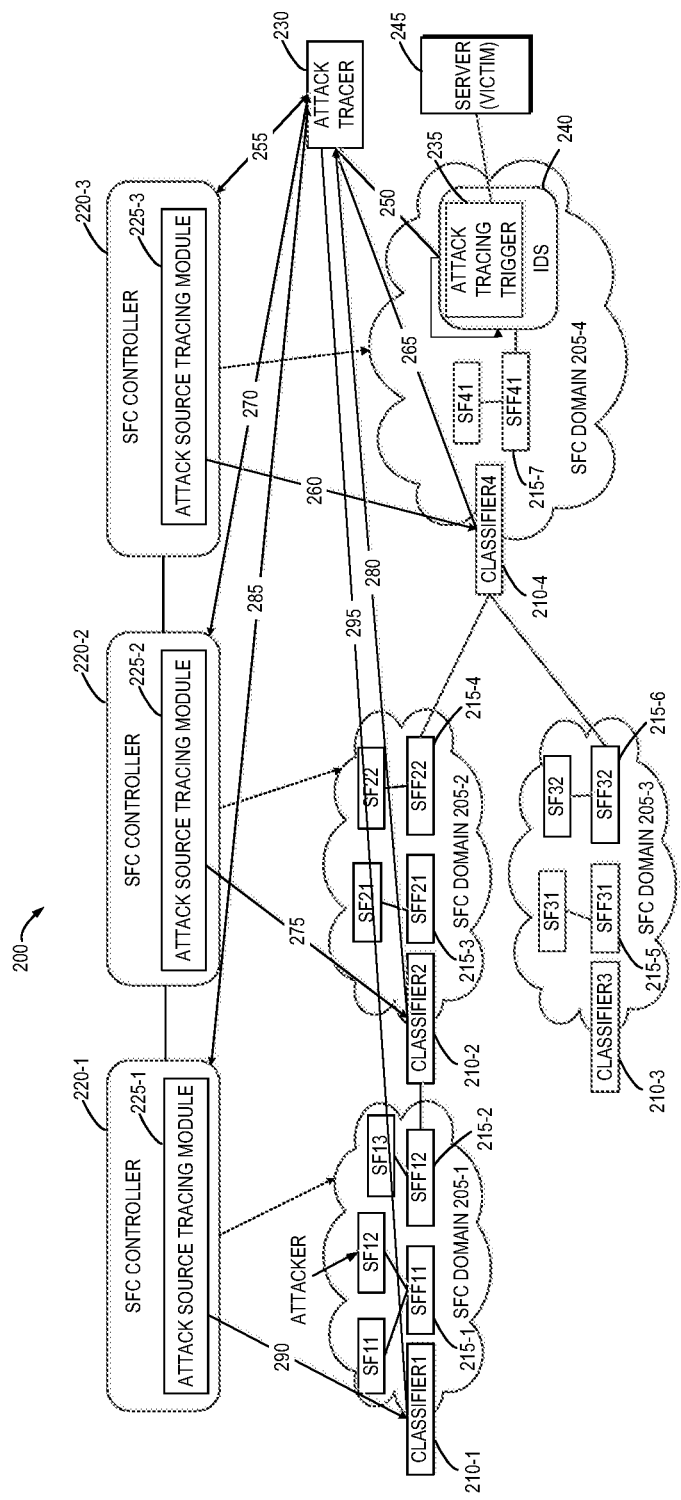
FIG. 2 illustrates an example process of tracing the attack source across a plurality of SFC domains in a SFC-enabled network according to embodiments of the present disclosure.

FIG. 2 shows an example process of tracing the attack source across a plurality of SFC domains in a SFC-enabled network 200 according to embodiments of the present disclosure.

As shown in FIG. 2, the network 200 includes four SFC domains 205-1, 205-2, 205-3 and 205-4. In this example, each of the SFC domains 205-1, 205-2, 205-3 or 205-4 includes one classifier 210-1, 210-2, 210-3 or 210-4 and multiple SFFs 215-1, 215-2, . . . , 215-7 and SFs 218-1, . . . , 218-8. The data flow can be transported via the classifier and SFFs and SFs. Each of the SFC domains 205-1, 205-2, 205-3 or 205-4 also has a SFC controller 220-1, 220-2, 220-3 or 220-4 for implementing the control functions. Each SFC controller 220-1, 220-2, 220-3 or 220-4 includes an attack source tracing module 225-1, 225-2, 225-3 or 225-4 that can communicate with an attack tracer 230 outside of the SFC domains 205-1, 205-2, 205-3 and 205-4.

An attack tracing trigger 235 is located/deployed in an intrusion detection system (IDS) 240. In this example, an attacker hijacks the SF 218-2 in the SFC domain 205-1 to attack a server 245. When IDS 240 detects an attacking data flow to the server 245, the attack tracing trigger 235 sends (250) a request for tracing an attack source of the attacking data flow to the attack tracer to initiate the process of tracing the attack source. The request includes flow characteristics such as the SPI of the flow and a source IP address of the flow. Then, the attack tracer 230 sends (255) the request to the SFC domain 205-4 closest to the server 245, for example, to the attack source tracing module 225-3 in the SFC controller 220-3. Moreover, the attack tracer 230 may log the event of tracing.

In this example, after receiving the request for tracing the attack source with the flow characteristics such the SPI and the source IP address of the flow, the attack source tracing module 225-3 sends (260) an instruction to the classifier 210-4 in the SFC domain 205-4 to perform flow matching based on the flow characteristic to determine whether the attacking data flow have been occurred before entering SFC domain 205-4. In the embodiments where the functions of the attack tracer 230 and the attack source tracing module 225-3 are integrated, the attack tracer 230 may send the request directly to the classifier 210-4 to instruct of the flow matching.

The classifier 210-4 determines whether the flow characteristics of the attacking data flow matches with flow characteristics associated with the attacking data flow stored locally. For example, the classifier 210-4 may check the source IP address and the SPI of the flow against the recorded source IP addresses and SPIs of flows passing.

In some embodiments, the checking may utilize a hash function. For example, when the classifier 210-4 receives a data flow from outside of the SFC domain 205-4, the classifier 210-4 may use a symmetric key (referred to as "SFC key") to calculate HASH_Classifier=hash (SPI, SFC ID, Classifier ID, the flow/packet ID, the source IP address of the flow/packet, SFC key). The SFC key may be void, or a value predefined for the SFC domain 205-4, or a value specific to the SFC-enabled entity such as the classifier 210-4 in the SFC domain 205-4.

Then, the classifier 210-4 stores the flow characteristics of the received data flow, including, for example, SPI, SFC ID, Classifier ID, the flow/packet ID, the source IP address of the flow/packet, and HASH_Classifier. In this case, after the classifier 210-4 receives the instruction for the flow matching, the classifier 210-4 calculates HASH_TRACE_Classifier=hash (SPI, SFC ID, Classifier ID, the flow/packet ID, the source IP address of the flow/packet for tracing, SFC key) by using the received flow characteristics, and then compares HASH_TRACE_Classifier with HASH_Classifier which is stored at the classifier 210-4.

In some embodiments, the classifier 210-4 may record inter-domain information as the flow characteristic of the received data flow. The inter-domain information may include, for example, the identifier of the adjacent upstream SFC domain (referred to as pre_SFC_ID), and the SPI in the adjacent upstream SFC domain (referred to as pre_SPI). In the context of the present disclosure, the adjacent upstream SFC domain is previous one of two SFC domains which a data flow passes through successively.

Figure 3:
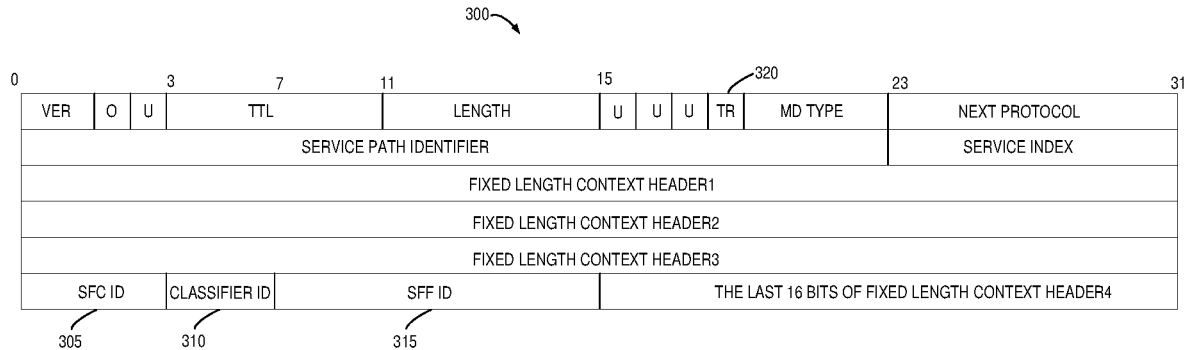
FIG. 3 illustrates an example of an extended NSH according to some embodiments of the present disclosure.

This inter-domain information may be carried in metadata for the data flow such as a network service header (NSH). FIG. 3 illustrates an example of an extended NSH 300 according to some embodiments of the present disclosure. As shown in FIG. 3, the last fixed length context header of four Fixed Length Context Headers in a NSH with MD Type=0×1 is selected to carry metadata for the adjacent upstream SFC domain. In this example, the first 4 bits of the selected fixed length context header is used as a "SFC ID" field 305 to record the ID of a specified SFC domain. The next 4 bits of the selected fixed length context header is used as a "Classifier ID" field 310 to record the ID of the classifier in the specified SFC domain. The next 8 bits of the selected fixed length context header is used as a "SFF ID" field 315 to record the ID of the SFF in the specified SFC domain.

Moreover, one of five unassigned bits in the conventional NSH Base Header is selected and marked as "TR" to indicate whether this NSH is an extended NSH or not. Based on this field, the receiver of the flow can determine whether the characteristics of the flow/packet are processed and recorded in order to support tracing attack source.

It is to be understood that the extension of the NSH is shown only for the purpose of illustration, without suggesting any limitations. Any suitable metadata for the adjacent upstream SFC domain may be extended in any suitable bits of the NSH. For example, for a NSH with MD Type=0×2, four or more variable Context Headers may be used to enable security protection for NSH information during transportation.

When receiving a flow, the classifier (for example, the classifier 210-4 in the SFC domain 205-4) reads the extended NSH Metadata such as SFC ID, Classifier ID, SFF ID and SPI. SFC ID in the received flow/packet is the identifier of the adjacent upstream SFC domain, which is referred to as pre_SFC_ID. Classifier ID in the received flow/packet is the identifier of the classifier in the adjacent upstream SFC domain, which is referred to as pre_Classifier_ID. SFF ID in the received flow/packet is SFF identifier of the adjacent upstream SFC domain, which is referred to as pre_SFF_ID. SPI is the service path identifier of the adjacent upstream SFC domain, which is referred to as pre_SPI. In some embodiments, the SPIs in different SFC domains are different to further distinguishing between different SFC domains.

The classifier 210-4 then records or keeps pre_SPI, pre_SFC_ID, pre_Classifier_ID, pre_SFF_ID of the received flow/packet from adjacent upstream SFC domain (for example, the SFC domain 205-2). If the received flow/packet is from a non-SFC network, the value of pre_SPI, pre_SFC_ID, pre_Classifier_ID, pre_SFF_ID is void. The classifier 210-4 then further records or keeps SPI, SFC ID, Classifier ID of the flow/packet in current SFC domain 205-4 and records or keeps the flow/packet ID and the source IP address of the flow/packet.

In the case that the classifier 210-4 records the pre_SPI, pre_SFC_ID, pre_Classifier_ID, pre_SFF_ID of the received flow/packet, the classifier 210-4 records hash (pre_SPI, pre_SFC_ID, pre_Classifier_ID, pre_SFF_ID, SPI, SFC ID, Classifier ID, the flow/packet ID, the source IP address of the flow/packet, SFC key). Before forwarding the received flow/packet to the next hop, such as the SFF 215-7, the classifier 210-4 inserts the ID of current SFC domain 205-4 in the SFC ID field and inserts its own ID in the Classifier ID field.

After the SFF 215-7 receives the flow from the classifier 210-4, the SFF 215-7 may take similar actions to those of the classifier 210-4. The SFF 215-7 records SPI, SFC ID, Classifier ID in current SFC domain 205-4 and records the ID and the source IP address of the flow. The SFF 215-7 uses a SFC key (which is void, or a value predefined for the SFC domain 205-4, or specific to the SFF 215-7) to calculate HASH_SFF=(SPI, SFF ID, the flow/packet ID, the source IP address of the flow/packet, SFC key) and records the hash value. Before forwarding the received flow/packet to the next hop, the SFF 215-7 inserts its own ID in the SFF ID. In some embodiments, the last SFF in a SFC domain may insert the ID of current SFC domain into the SFC ID field.

In this case where the classifier 210-4 records the value of hash (pre_SPI, pre_SFC_ID, pre_Classifier_ID, pre_SFF_ID, SPI, SFC ID, Classifier ID, the flow/packet ID, the source IP address of the flow/packet, SFC key), when the classifier 210-4 receives the instruction of the flow matching, the classifier 210-4 uses the SPI and the source IP address of the attacking flow to calculate HASH_TRACE_Classifier=hash (pre_SPI, pre_SFC_ID, pre_Classifier_ID, pre_SFF_ID, SPI, SFC ID, Classifier ID, the flow/packet ID, the source IP address of the flow/packet for tracing, SFC key) and compares HASH_TRACE_Classifier with the recorded hash value.

Still with reference to FIG. 2, if HASH_TRACE_Classifier is equal to HASH_Classifier, the classifier 210-4 then sends (265) a result of the flow matching that indicates "Yes_Matching" to the attack tracer 230. Accordingly, the attack tracer 230 can determine that the attacking data flow is transmitted through the classifier 210-4, which shows that the attack source is absent in the SFC domain 205-4.

The attack tracer 230 sends the request for tracing the attack source to a further SFC domain to continue the attack source tracing. In this example, the attack tracer 230 sends (270) the request to the attack source tracing module 225-2 in the SFC domain 205-2 which is the adjacent upstream SFC domain of the SFC 205-4. The attack tracer 230 may determine the adjacency of the SFC domains in any suitable way. In the embodiments where the classifier 210-4 records the information of the adjacent upstream SFC domain such as SFC ID, the attack tracer 230 may receive the SFC ID from the classifier 210, for example, together with the result of the flow matching.

The operations within the SFC domain 205-2 are similar to those in the SFC domain 205-4. After determining that the SPI of the attacking flow is classifier 210-2->SFF 215-3->SF 218-4->SFF 215-3->SFF 215-4->SF 218-5->SFF 215-4), the network attack source tracing module 225-2 sends (275) an instruction to the classifier 210-2 to perform the flow matching.

The classifier 210-2 calculates HASH_TRACE_Classifier=hash (pre_SPI, pre_SFC_ID, pre_Classifier_ID, pre_SFF_ID, SPI, SFC ID, Classifier ID, the flow/packet ID, the source IP address of the flow/packet for tracing, SFC key) and compares HASH_TRACE_Classifier with HASH_Classifier which is stored in the classifier 210-2. In this example, the classifier 210-2 sends (280) a result of the flow matching that indicates "Yes_Matching" to the attack tracer 230 and the last hop information (for example, pre_SPI, pre_SFC_ID, pre_Classifier_ID, pre_SFF_ID) to the attacks tracer 230.

After receiving the result of "Yes_Matching" and the last hop information (for example, pre_SPI, pre_SFC_ID, pre_Classifier_ID, pre_SFF_ID) from the classifier 210-2 in the SFC domain 205-2, the attack tracer 230 determines that this attack may come from the adjacent upstream SFC domain 205-1. Then, the attack tracer 230 sends (285) the request with the flow characteristics to the network attack source tracing module 225-1 in the SFC domain 205-1. The attack tracer 230 may also log this event.

Then, the attack source tracing module 225-1 determines that the service chain is classifier 210-1->SFF 215-1->SF 218-2->SFF 215-1->SFF 215-2->SF 218-3->SFF 215-2) according to SPI identifier in the SFC domain 205-1. The attack source tracing module 225-1 sends (290) an instruction to the classifier 205-1 to perform the flow matching.

The classifier 210-1 calculates HASH_TRACE_Classifier=hash (pre_SPI, pre_SFC_ID, pre_Classifier_ID, pre_SFF_ID, SPI, SFC ID, Classifier ID, the flow/packet ID, the source IP address of the flow/packet for tracing, SFC key) and compares HASH_TRACE_Classifier with HASH_Classifier which is locally stored. Since the SF 218-2 is hijacked by the attacker, HASH_TRACE_Classifier is not equal to HASH_Classifier. Then, the classifier 210-1 sends a result of the flow matching that indicates "No_Matching" to the attack tracer 230 because the source IP address of the flow/packet for tracing is not transmitted through the classifier 210-1.

Then, the attack tracer 230 determines that the origin of this attack is in the SFC domain 205-1. The procedure of tracing the attack source in one single SFC domain will be initiated. In some embodiments, the attack source tracing may be initiated by the attack tracer 230 by sending the request for tracing the attack source again to the SFC controller 220-1 in the SFC domain 205-1. The SFC controller 220-1 may obtain the "No_Matching" indication from the classifier 210-1 and determine that the attack source is located within the SFC domain 205-1. Then, the SFC controller 220-1 instructs the SFC components or entities in the SPI to perform the flow matching.

Figure 4A:
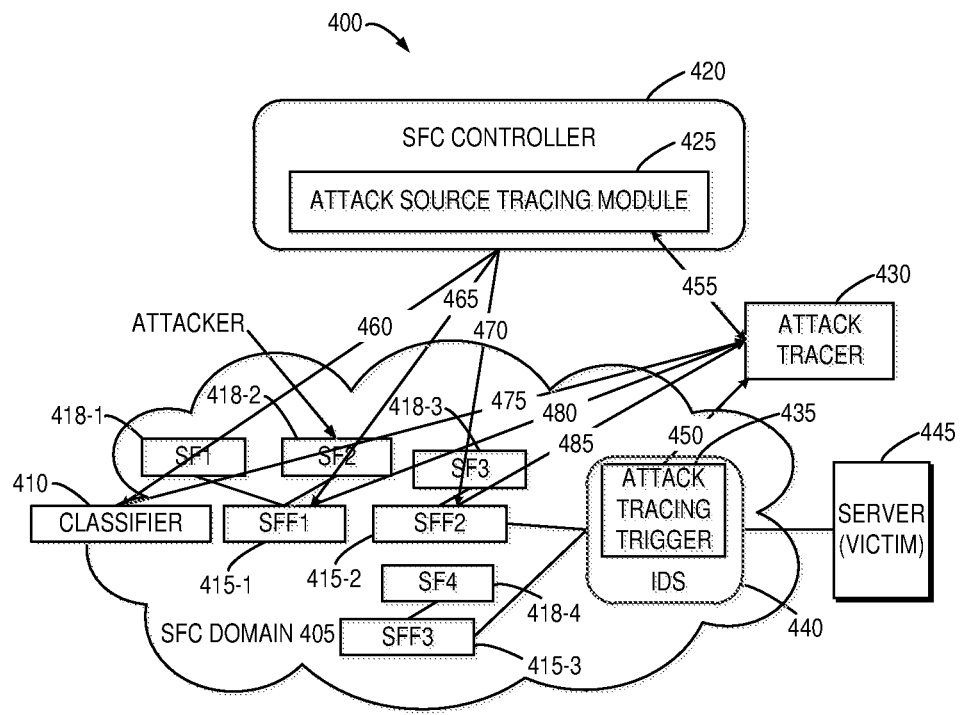
FIG. 4(a) illustrates an example process of tracing the attack source in a signal SFC domain in a SFC-enabled network according to some embodiments of the present disclosure.

Example processes of tracing the attack source in a single SFC domain will be discussed below with reference to FIGS. 4(a) and 4(b). FIG. 4(a) shows an example process of tracing the attack source in a signal SFC domain in a SFC-enabled network 400 according to some embodiments of the present disclosure. In the network 400, the network attack occurs in a SFC domain 405 which includes a classifier 410, three SFFs 415-1, 415-2 and 415-3, and four SFs 418-1, 418-2, 418-3 and 418-4. The SFC domain 405 further includes a SFC controller 420 having an attack source tracing module 425. An attack tracer 430 is responsible for the attack source tracing within the SFC domain 405. An attack tracing trigger 435 is included in an IDS 440 which is arranged in the SFC domain 405. The data flow is transmitted via the IDS 440 to a server 445.

In this example, as shown, the SF 418-2 is hijacked by the attacker. When the IDS 440 detects the attacks to the server 445, the attack tracing trigger 435 triggers an attack tracer 430 to initiate the attack source tracing within the SFC domain 405. For example, the attack tracing trigger 435 sends (450) a request for tracing the attack source with flow characteristics (for example, SPI and the source IP address of the flow for tracing) to the attack tracer 430.

After receiving the request, the attack tracer 430 forwards (455) the request with the flow characteristics to the attack source tracing module 425 in the SFC controller 420. The attack source tracing module 425 determines that the service chain of the attacking data flow is classifier 410->SFF 415-1->SF 418-2->SFF 415-1->SFF 415-2->SF 418-3->SFF 415-2->IDS->Server. Then, the attack source tracing module 425 concurrently sends (460, 465, 470) instructions to the classifier 410, the SFF 415-1 and the SFF 415-2 to perform the flow matching based on the flow characteristics.

The classifier 410 calculates HASH_TRACE_Classifier=hash (SPI, SFC ID, Classifier ID, the flow/packet ID, the source IP address of the flow/packet for tracing, SFC key). In this example, the SFC key is predefined for the SFC domain 405. The classifier 410 compares HASH_TRACE_Classifier with HASH_Classifier which is stored at the classifier 410. Then, the classifier 410 sends (475) the "Not_Matching" result to the attack tracer 430 since the source IP address of the flow for tracing is not transmitted through the classifier 410.

The SFF 415-1 calculates HASH_TRACE_SFF1=hash (SPI, SFF1 ID, the flow/packet ID, the source IP address of the flow/packet for tracing, SFC Key) and compares HASH_TRACE_SFF1 with HASH_SFF1 which is stored at the SFF 415-1. Then, the SFF 415-1 sends (480) the "Yes_Matching" result to the attack tracer 430 since the source IP address of the flow for tracing is transmitted through the SFF 415-1. The SFF 415-2 performs the same operations as the SFF 415-1 does and sends (485) the "Yes_Matching" result to the attack tracer 430.

Based on the results of the flow matching, the attack tracer 430 can determine which SFF the attacks come from. For example, in some embodiments, the attack source tracing module 425 may send the determined SFP to the attack tracer 430. Based on the results and the SFP, the attack tracer 430 may determine that the attack is from the SFF 415-1 and finally identifies that the attack source is the SF 418-2.

Figure 4B:
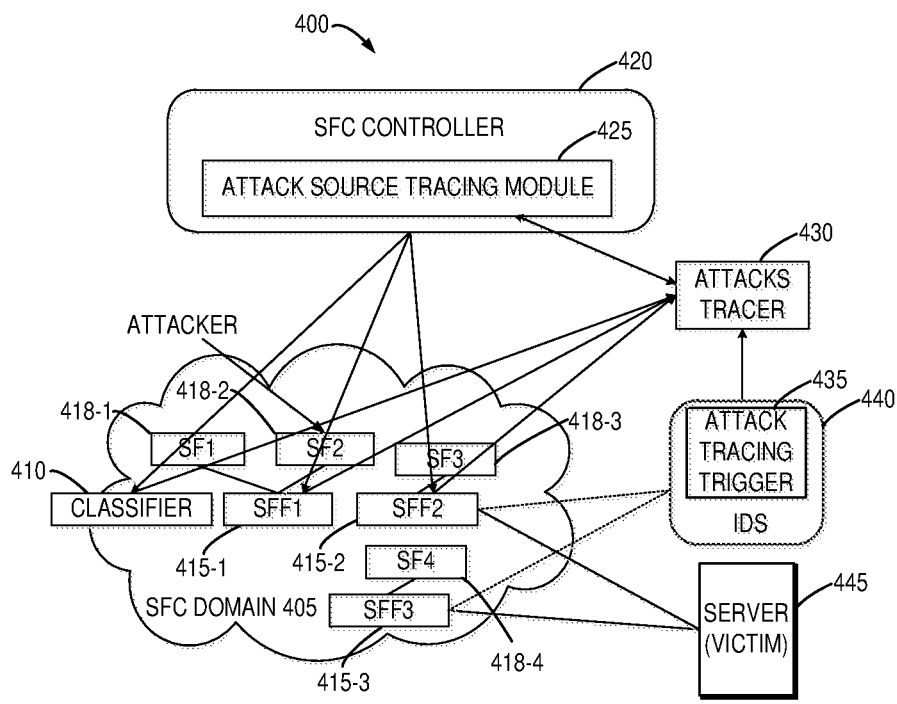
FIG. 4(b) illustrates an example process of tracing the attack source in a signal SFC domain in a SFC-enabled network according to some other embodiments of the present disclosure.

FIG. 4(b) shows another arrangement of the SFC-enabled network 400. In this example, the IDS 440 is arranged outside of the SFC domain 405, and the data flow is transmitted directly from the SFC domain 405 to the server 445 bypassing the IDS 440. The operations and processing are similar to those as described above with reference to FIG. 4(*a*), and the details thereof will be omitted.

It is to be understood that in addition to the attack tracer, other SFC components or entities may initiated the attack source tracing in a single SFC domain. For example, the classifier may send the "No_Matching" indication to the corresponding SFC controller so that the SFC controller determine that the attack source is located within the SFC domain and concurrently sends the instructions to the SFFs included in the SFP to perform the flow matching.

According to embodiments of the present disclosure, during flow or packet transportation, SFC components or entities such as a classifier and a SFF may record at local storages flow or packet characteristics, for example, a part of payload, a service path identifier (SPI), a classifier identifier, a SFF identifier and the like. When the network attacks are detected, the SFP of the attacking flow or packet can be identified according to the SPI, then the corresponding SFC components (for example, the classifier, or the SFF) will be identified and notified in parallel to send flow/packet matching results (by comparing with the logs of the flow/packet passed by). Further, the flow/packet matching results are analyzed at the attack tracer, and finally the SFC component (for example, a SF) originating the attacking packets can be identified. Comparing with IP based trace back schemes, the number of hops (for example, routers, SFFs, classifier) may decreased and the system performance may be improved since the flow/packet matching is done in parallel, not hop by hop.

Figure 5:
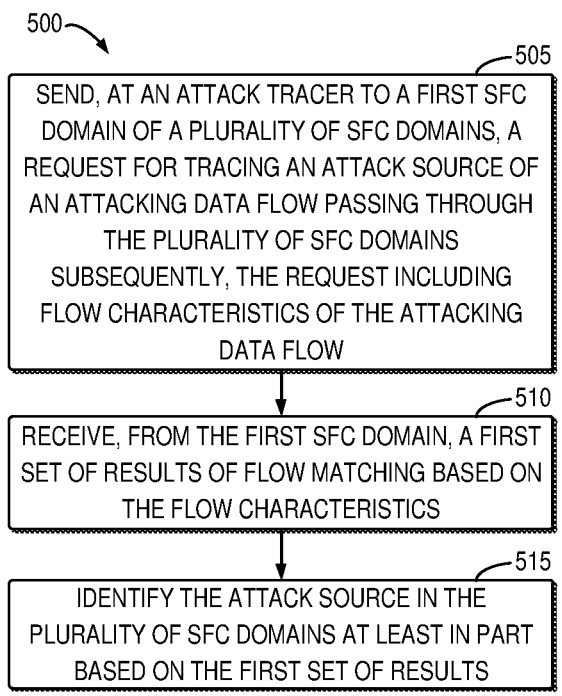
FIG. 5 illustrates a flowchart of an example method in accordance with some embodiments of the present disclosure.

FIG. 5 shows a flowchart of an example method 500 in accordance with some embodiments of the present disclosure. The method 500 can be implemented at the attack tracer 230 or 430 in FIG. 2, 4(*a*) or 4(*b*).

At block 505, a request for tracing an attack source of an attacking data flow is sent to a service function chain (SFC) domain (referred to as a first SFC domain) of a plurality of SFC domains. The attacking data flow passes through the plurality of SFC domains subsequently. The request includes flow characteristics of the attacking data flow. At block 510, a first set of results of flow matching based on the flow characteristics is received from the first SFC domain. At block 515, the attack source is identified in the plurality of SFC domains at least in part based on the first set of results.

In some embodiments, the request may be sent to a SFC controller in the first SFC domain.

In some embodiments, the first set of results may include an indication whether the flow characteristics of the attacking data flow matches with flow characteristics of the attacking data flow stored at a classifier in the first SFC domain. In these embodiments, the first indication may be received from the classifier in the first SFC domain.

In some embodiments, in response to the indication that the flow characteristics of the attacking data flow matches with the stored flow characteristics, it may be determined that the attack source is absent in the first SFC domain. Then, the request for tracing the attack source may be sent to a further SFC domain (referred to as a second SFC domain) of the plurality of SFC domains. The attacking data flow passing through the second and first SFC domains successively. A second set of results of flow matching based on the flow characteristics may be received from the second SFC domain. The attack source may be identified in the plurality of SFC domains at least in part based on the second set of results.

In some embodiments, an identification of the second SFC domain may be received from the classifier in the first SFC domain.

In some embodiments, in response to the first indication indicating that the flow characteristics of the attacking data flow mismatches with the stored flow characteristics, it may be determined that the attack source is present in the first SFC domain.

In some embodiments, the first set of results may include a set of indications whether the flow characteristics of the attacking data flow matches with flow characteristics of the attacking data flow stored at a set of service function forwarders (SFFs) in the first SFC domain. In these embodiments, the set of indications may be received from the set of SFFs in the first SFC domain.

In some embodiments, a service function path (SFP) of the attacking data flow in the first SFC domain may be received from a SFC controller in the first SFC domain. Then, the attack source may be identified in the first domain based on the set of indications and the SFP.

Figure 6:
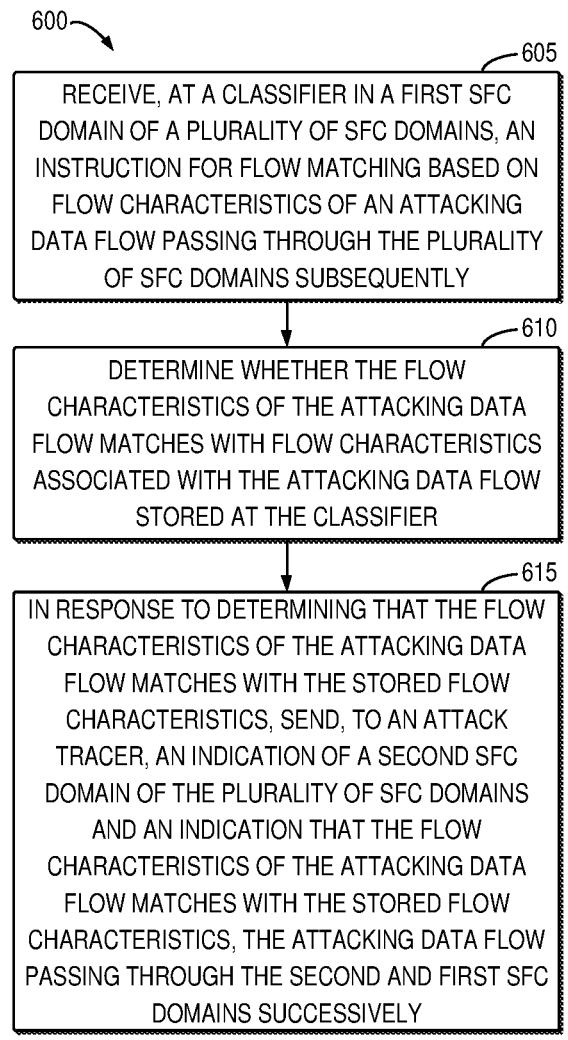
FIG. 6 illustrates a flowchart of an example method in accordance with some other embodiments of the present disclosure.

FIG. 6 shows a flowchart of an example method 600 in accordance with some embodiments of the present disclosure. The method 600 can be implemented at a classifier in a SFC domain of a plurality of SFC domains.

At block 605, an instruction is received for flow matching based on flow characteristics of an attacking data flow passing through the plurality of SFC domains subsequently. At block 610, it is determined whether the flow characteristics of the attacking data flow matches with flow characteristics associated with the attacking data flow stored at the classifier. At block 615, in response to determining that the flow characteristics of the attacking data flow matches with the stored flow characteristics, an indication of a second SFC domain of the plurality of SFC domains is sent to an attack tracer as well as an indication that the flow characteristics of the attacking data flow matches with the stored flow characteristics. The attacking data flow passes through the second and first SFC domains successively.

In some embodiments, the flow characteristics of the attacking data flow may include a source Internet Protocol (IP) address of the attacking data flow. In these embodiments, flow characteristics associated with the attacking data flow is selected based on the source IP address of the attacking data from flow characteristics stored at the classifier. Then, it is determined whether the flow characteristics of the attacking data flow matches with the selected flow characteristics.

In some embodiments, a hash value may be calculated based on the flow characteristics of the attacking data flow. Then, the calculated hash value may be compared with a hash value calculated based on the selected flow characteristics.

In some embodiments, information on an adjacent upstream SFC domain of the first SFC domain for a data flow may be stored.

In some embodiments, an identifier of the first SFC domain may be recorded into metadata of a data flow.

In some embodiments, the request for tracing the attack source may be received from a SFC controller in the first SFC domain.

Figure 7:
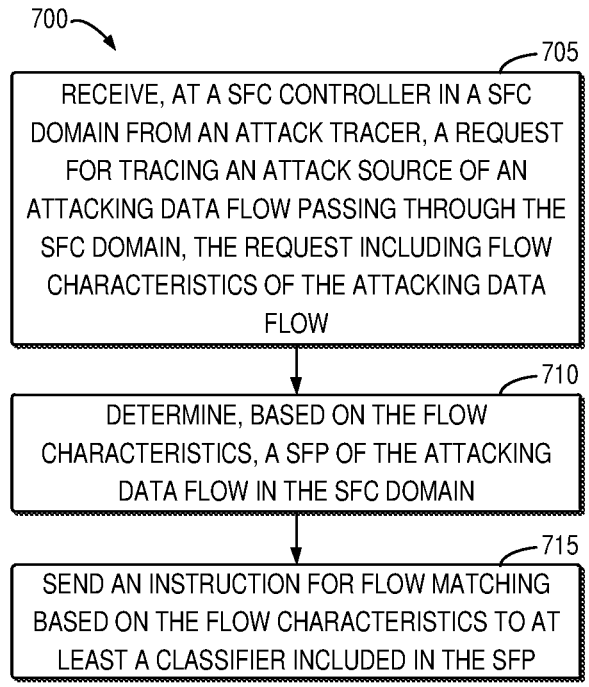
FIG. 7 illustrates a flowchart of an example method in accordance with some other embodiments of the present disclosure.

FIG. 7 shows a flowchart of an example method 700 in accordance with some embodiments of the present disclosure. The method 700 can be implemented at a service function chain (SFC) controller in a SFC domain.

At block 705, a request for tracing an attack source of an attacking data flow passing through the SFC domain is received from an attack tracer. The request includes flow characteristics of the attacking data flow. At block 710, a service function path (SFP) of the attacking data flow in the SFC domain is determined based on the flow characteristics. At block 715, an instruction for flow matching based on the flow characteristics is sent to at least a classifier included in the SFP.

In some embodiments, in response to the attack source being present in the SFC domain, instructions for the flow matching based on the flow characteristics are concurrently sent to the classifier and a set of service function forwarders (SFFs) included in the SFP.

In some embodiments, the SFP is sent to the attack tracer.

It is to be understood that all operations and features related to the attack tracer, the classifier and the SFC controller described above with reference to FIGS. 2, 3, 4(*a*) and 4(*b*) are likewise applicable to the methods 500, 600 and 700 and have similar effects. For the purpose of simplification, the details will be omitted.

In some embodiments, an apparatus capable of performing the method 500, 600 or 700 may comprise means for performing the respective steps of the method 500, 600 or 700. The means may be implemented in any suitable form. For example, the means may be implemented in a circuitry or software module.

In some embodiments, the apparatus capable of performing the method 500 comprises: means for sending, at an attack tracer to a first service function chain (SFC) domain of a plurality of SFC domains, a request for tracing an attack source of an attacking data flow passing through the plurality of SFC domains subsequently, the request including flow characteristics of the attacking data flow; means for receiving, from the first SFC domain, a first set of results of flow matching based on the flow characteristics; and means for identifying the attack source in the plurality of SFC domains at least in part based on the first set of results.

In some embodiments, the means for sending the request comprises: means for sending the request to a SFC controller in the first SFC domain.

In some embodiments, the first set of results include an indication whether the flow characteristics of the attacking data flow matches with flow characteristics of the attacking data flow stored at a classifier in the first SFC domain. The means for receiving the first set of results comprises: means for receiving the first indication from the classifier in the first SFC domain.

In some embodiments, the means for identifying the attack source comprises: means for in response to the indication that the flow characteristics of the attacking data flow matches with the stored flow characteristics, determining that the attack source is absent in the first SFC domain; means for sending the request for tracing the attack source to a second SFC domain of the plurality of SFC domains, the attacking data flow passing through the second and first SFC domains successively; means for receiving, from the second SFC domain, a second set of results of flow matching based on the flow characteristics; and means for identifying the attack source in the plurality of SFC domains at least in part based on the second set of results.

In some embodiments, the apparatus may comprise means for receiving an identification of the second SFC domain from the classifier in the first SFC domain.

In some embodiments, the means for identifying the attack source comprises: means for in response to the first indication indicating that the flow characteristics of the attacking data flow mismatches with the stored flow characteristics, determining that the attack source is present in the first SFC domain.

In some embodiments, the first set of results includes a set of indications whether the flow characteristics of the attacking data flow matches with flow characteristics of the attacking data flow stored at a set of service function forwarders (SFFs) in the first SFC domain. The means for receiving the first set of results comprises: means for receiving the set of indications from the set of SFFs in the first SFC domain.

In some embodiments, the means for identifying the attack source comprises: means for receiving, from a SFC controller in the first SFC domain, a service function path (SFP) of the attacking data flow in the first SFC domain; and means for identifying the attack source in the first domain based on the set of indications and the SFP.

In some embodiments, the apparatus capable of performing the method 600 comprises: means for receiving, at a classifier in a first service function chain (SFC) domain of a plurality of SFC domains, an instruction for flow matching based on flow characteristics of an attacking data flow passing through the plurality of SFC domains subsequently; means for determining whether the flow characteristics of the attacking data flow matches with flow characteristics associated with the attacking data flow stored at the classifier; and means for in response to determining that the flow characteristics of the attacking data flow matches with the stored flow characteristics, sending, to an attack tracer, an indication of a second SFC domain of the plurality of SFC domains and an indication that the flow characteristics of the attacking data flow matches with the stored flow characteristics, the attacking data flow passing through the second and first SFC domains successively.

In some embodiments, the flow characteristics of the attacking data flow include a source Internet Protocol (IP) address of the attacking data flow. The means for determining whether the flow characteristics of the attacking data flow matches with the stored flow characteristics comprises: means for selecting, based on the source IP address of the attacking data, flow characteristics associated with the attacking data flow from flow characteristics stored at the classifier; and means for determining whether the flow characteristics of the attacking data flow matches with the selected flow characteristics.

In some embodiments, the means for determining whether the flow characteristics of the attacking data flow matches with the selected flow characteristics may comprise: means for calculating a hash value based on the flow characteristics of the attacking data flow; and means for comparing the calculated hash value with a hash value calculated based on the selected flow characteristics.

In some embodiments, the apparatus may further comprise: means for storing information on an adjacent upstream SFC domain of the first SFC domain for a data flow.

In some embodiments, the apparatus may further comprise: means for recording an identifier of the first SFC domain into metadata of a data flow.

In some embodiments, the means for receiving the request for tracing the attack source may comprise: means for receiving the request for tracing the attack source from a SFC controller in the first SFC domain.

In some embodiments, the apparatus capable of performing the method 700 comprises: means for receiving, at a service function chain (SFC) controller in a SFC domain from an attack tracer, a request for tracing an attack source of an attacking data flow passing through the SFP domain, the request including flow characteristics of the attacking data flow; means for determining, based on the flow characteristics, a service function path (SFP) of the attacking data flow in the SFC domain; and means for sending an instruction for flow matching based on the flow characteristics to at least a classifier included in the SFP.

In some embodiments, the means for sending the instruction for the flow matching to at least the classifier comprises: means for in response to the attack source being present in the SFC domain, concurrently sending instructions for the flow matching based on the flow characteristics to the classifier and a set of service function forwarders (SFFs) included in the SFP.

In some embodiments, the apparatus may further comprise: means for sending the SFP to the attack tracer.

Figure 8:
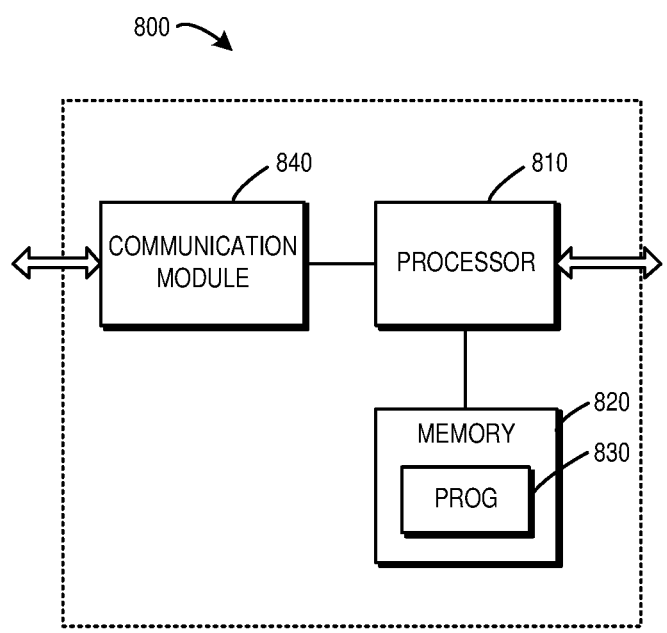
FIG. 8 illustrates a simplified block diagram of a device that is suitable for implementing embodiments of the present disclosure.

FIG. 8 is a simplified block diagram of a device 800 that is suitable for implementing embodiments of the present disclosure. The device 800 can be implemented at or as at least a part of the attack tracer, the classifier, or the SFC controller.

As shown, the device 800 includes a processor 810, a memory 820 coupled to the processor 810, a communication module 840 coupled to the processor 810, and a communication interface (not shown) coupled to the communication module 840. The memory 820 stores at least a program 830. The communication module 840 is for bidirectional communications. The communication interface may represent any interface that is necessary for communication.

The program 830 is assumed to include program instructions that, when executed by the associated processor 810, enable the device 800 to operate in accordance with the embodiments of the present disclosure, as discussed herein with reference to FIGS. 4-9. The embodiments herein may be implemented by computer software executable by the processor 810 of the device 800, or by hardware, or by a combination of software and hardware. The processor 810 may be configured to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

When the device 800 acts as the attack tracer, the processor 810 and the memory 820 may cooperate to cause the device 800 to implement the method 500 as discussed herein with reference to FIG. 5. When the device 800 acts as the classifier, the processor 810 and the memory 820 may cooperate to cause the device 800 to implement the method 600 as discussed herein with reference to FIG. 6. When the device 800 acts as the SFC controller, the processor 810 and the memory 820 may cooperate to cause the device 800 to implement the method 700 as discussed herein with reference to FIG. 7.

All operations and features related to the attack tracer, the classifier and the SFC controller described above with reference to FIGS. 2-7 are likewise applicable to the device 800 and have similar effects. For the purpose of simplification, the details will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500, 600 and 700 as described above with reference to FIGS. 5-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A device comprising:
   at least one processor; and
   at least one memory including computer program code;
   the at least one memory and the computer program code configured to, with the at least one processor, cause the device to:
   send at an attack tracer to a first service function chain domain of a plurality of service function chain domains, a request for tracing an attack source of an attacking data flow passing through the plurality of the service function chain domains subsequently, the request including flow characteristics of the attacking data flow;
   receive, from the first service function chain domain, a first set of results of flow matching based on the flow characteristics; and
   identify the attack source in the plurality of the service function chain domains at least in part based on the first set of the results.

2. The device of claim 1, wherein send the request further comprises:
   send the request to a service function chain controller in the first service function chain domain.

3. The device of claim 1, wherein the first set of the results comprise an indication whether the flow characteristics of the attacking data flow matches with flow characteristics of the attacking data flow stored at a classifier in the first service function chain domain, and receive the first set of results further comprises:
   receive the indication from the classifier in the first service function chain domain.

4. The device of claim 3, wherein identify the attack source further comprises:
   in response to the indication that the flow characteristics of the attacking data flow matches with the stored flow characteristics at the classifier, determine that the attack source is absent in the first service function chain domain;
   send the request for tracing the attack source to a second service function chain domain of the plurality of service function chain domains, the attacking data flow passing through the second and first service function chain domains successively;
   receive, from the second service function chain domain, a second set of results of flow matching based on the flow characteristics; and
   identify the attack source in the plurality of service function chain domains at least in part based on the second set of the results.

5. The device of claim 4, wherein the device is further caused to:
   receive an identification of the second service function chain domain from the classifier in the first service function chain domain.

6. The device of claim 3, wherein identify the attack source further comprises:
   in response to the indication indicating that the flow characteristics of the attacking data flow mismatches with the stored flow characteristics at the classifier, determine that the attack source is present in the first service function chain domain.

7. The device of claim 1, wherein the first set of results comprise a set of indications whether the flow characteristics of the attacking data flow matches with flow characteristics of the attacking data flow stored at a set of service function forwarders in the first service function chain domain, and receive the first set of results further comprises:
   receive the set of indications from the set of service function forwarders in the first service function chain domain.

8. The device of claim 7, wherein identify the attack source further comprises:
   receive, from a service function chain controller in the first service function chain domain, a service function path of the attacking data flow in the first service function chain domain; and
   identify the attack source in the first domain based on the set of indications and the service function path.

9. A device comprising:
   at least one processor; and
   at least one memory including computer program code;
   the at least one memory and the computer program code configured to, with the at least one processor, cause the device to:
   receive, at a classifier in a first service function chain domain of a plurality of service function chain domains, an instruction for flow matching based on flow characteristics of an attacking data flow passing through the plurality of the service function chain domains subsequently;
   determine whether the flow characteristics of the attacking data flow matches with flow characteristics associated with the attacking data flow stored at the classifier; and
   in response to determine that the flow characteristics of the attacking data flow matches with the stored flow characteristics, send, to an attack tracer, an indication of a second service function chain domain of the plurality of service function chain domains and an indication that the flow characteristics of the attacking data flow matches with the stored flow characteristics, the attack data flow passing through the second and first service function chain domains successively.

10. The device of claim 9, wherein the flow characteristics of the attacking data flow comprise a source Internet Protocol address of the attacking data flow, and determine whether the flow characteristics of the attacking data flow matches with the stored flow characteristics further comprises:
- select, based on the source Internet Protocol address of the attacking data, flow characteristics associated with the attacking data flow from flow characteristics stored at the classifier; and
- determine whether the flow characteristics of the attacking data flow matches with the selected flow characteristics.

11. The device of claim 10, wherein determine whether the flow characteristics of the attacking data flow matches with the selected flow characteristics further comprises:
- calculate a hash value based on the flow characteristics of the attacking data flow; and
- compare the calculated hash value with a hash value calculated based on the selected flow characteristics.

12. The device of claim 9, wherein the device is further caused to:
- store information on an adjacent upstream service function chain domain of the first service function chain domain for a data flow.

13. The device of claim 9, wherein the device is further caused to:
- record an identifier of the first service function chain domain into metadata of a data flow.

14. The device of claim 9, wherein receive the request for tracing the attack source further comprises:
- receive the request for tracing the attack source from a service function chain controller in the first service function chain domain.

15. A device comprising:
- at least one processor; and
- at least one memory including computer program code;
- the at least one memory and the computer program code configured to, with the at least one processor, cause the device to:
- receive, at a service function chain controller in a service function chain domain from an attack tracer, a request for tracing an attack source of an attacking data flow passing through the service function chain domain, the request comprising flow characteristics of the attacking data flow;
- determine, based on the flow characteristics, a service function path of the attacking data flow in the service function chain domain; and
- send an instruction for flow matching based on the flow characteristics to at least a classifier comprised in the service function path.

16. The device of claim 15, wherein send the instruction for the flow matching to at least the classifier comprises:
- in response to the attack source being present in the service function chain domain, concurrently send instructions for the flow matching based on the flow characteristics to the classifier and a set of service function forwarders comprised in the service function path.

17. The device of claim 15, wherein the device is further caused to:
- send the service function path to the attack tracer.

* * * * *